United States Patent
Yakata et al.

(10) Patent No.: US 6,854,767 B2
(45) Date of Patent: Feb. 15, 2005

(54) SHOULDER BELT ANCHOR MOUNTING STRUCTURE FOR A VEHICLE AND A VEHICLE THEREOF

(75) Inventors: Takashi Yakata, Toyoake (JP); Hideki Honjo, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 144 days.

(21) Appl. No.: 10/270,033

(22) Filed: Oct. 11, 2002

(65) Prior Publication Data

US 2003/0094804 A1 May 22, 2003

(30) Foreign Application Priority Data

Oct. 12, 2001 (JP) ........................................ 2001-315693

(51) Int. Cl.⁷ ............................................. B60R 22/00
(52) U.S. Cl. ................................. 280/808; 296/187.12
(58) Field of Search ............................. 280/801.1, 808; 296/30, 187.11, 187.12, 203.03, 203.04; 297/468, 483, 486

(56) References Cited

U.S. PATENT DOCUMENTS

| | | | | |
|---|---|---|---|---|
| 4,470,619 A | * | 9/1984 | Imajyo et al. | ............... 280/808 |
| 4,645,232 A | * | 2/1987 | Hamada et al. | ........... 280/801.1 |
| 4,763,925 A | * | 8/1988 | Onoe et al. | ................. 280/808 |
| 4,938,525 A | * | 7/1990 | Yamauchi | ............... 296/203.03 |
| 4,973,103 A | * | 11/1990 | Imajyo et al. | ......... 296/203.04 |
| 4,986,570 A | * | 1/1991 | Quinting | ..................... 280/808 |
| 5,022,704 A | * | 6/1991 | Mizuno et al. | ........ 296/203.03 |
| 5,106,121 A | * | 4/1992 | Boone | ......................... 280/807 |
| 5,265,909 A | * | 11/1993 | Verbeski | ..................... 280/808 |
| 5,590,907 A | * | 1/1997 | McQueen et al. | ........ 280/801.1 |
| 5,671,968 A | * | 9/1997 | Masuda et al. | ......... 296/187.12 |
| 6,042,176 A | * | 3/2000 | Ikeda et al. | ............ 296/187.05 |
| 6,126,230 A | * | 10/2000 | Ikeda et al. | ............ 296/187.05 |
| 6,217,109 B1 | * | 4/2001 | Okana et al. | .......... 296/203.03 |
| 6,302,442 B1 | * | 10/2001 | Shimozawa | ................. 280/807 |
| 6,328,376 B2 | * | 12/2001 | Son | ....................... 296/203.03 |
| 6,336,662 B1 | * | 1/2002 | Kurita et al. | ............ 280/801.1 |

FOREIGN PATENT DOCUMENTS

| | | | | |
|---|---|---|---|---|
| JP | | 62094454 A | * | 4/1987 |
| JP | | 62094455 A | * | 4/1987 |

* cited by examiner

*Primary Examiner*—Eric Culbreth
(74) *Attorney, Agent, or Firm*—Rossi, Kimms & McDowell

(57) ABSTRACT

A vehicle has a shoulder anchor mounting structure. In the shoulder anchor mounting structure, a side roof rail extending in a longitudinal direction of a vehicle at a roof side of the vehicle is constructed such that an inner member and an outer member thereof form a closed section. A first reinforcement that partitions the closed section is interposed between the inner member and the outer member, and a second reinforcement that has a peripheral edge thereof joined to the first reinforcement is interposed between the first reinforcement and the inner member. The second reinforcement has a bottom wall joined to an inner surface wall of the inner member, and a shoulder anchor member of a seat belt is mounted on an abutment part where the bottom wall and the inner member abut on each other.

11 Claims, 4 Drawing Sheets

SHOULDER BELT ANCHOR MOUNTING STRUCTURE FOR A VEHICLE AND A VEHICLE THEREOF

CROSS REFERENCES TO RELATED APPLICATION

This non-provisional application incorporates by reference the subject matter of Application No. 2001-4459 filed in Japan on Oct. 12, 2001, on which a priority claim is based under 35 U.S.C. § 119(a).

BACKGROUND OF THE INVENTION

1. Field of the Invention

The present invention relates to a mounting structure of a shoulder anchor provided on a side roof rail of a vehicle.

2. Description of the Related Art

A shoulder anchor member of a seat belt for a rear seat of a vehicle is mounted on die upper part of a rear pillar, for example. However, in a case where the rear seat is located at the rear of the rear pillar or in a case where a seat back of the rear seat is located at the rear of the rear pillar, there is the necessity of positioning the shoulder anchor member at the rear of the rear pillar.

For example, Japanese Utility Model Publication No. 3-44616 discloses a structure in which a shoulder anchor member mounted on a rear roof rail at the rear-most part of a vehicle, but this structure has the disadvantage that the distance between a rear seat and the shoulder anchor member is excessively long.

SUMMARY OF THE INVENTION

In view of the above, it would therefore be desirable to provide a shoulder anchor mounting structure of a vehicle that is capable of mounting a shoulder anchor member of a seat belt at such a position that the distance between a rear seat and the shoulder anchor member is not excessively long even in a case where the rear seat is located at the rear of a rear pillar or in a case where a back seat of the rear seat is located at the rear of the rear pillar.

To attain the above object, the present invention provides a mounting structure of a shoulder anchor for a vehicle comprising: a side roof rail extending in a longitudinal direction of the vehicle at a roof side of the vehicle; a rear pillar; a rear seat comprising a back seat capable of moving to a position at rear of the rear pillar; and a shoulder belt anchor member that supports and fixes a seat belt, which secures an occupant seated on said rear seat, to said side roof rail located at the rear of the rear pillar.

BRIEF DESCRIPTION OF DRAWINGS

The nature of this invention, as well as other subjects and advantages thereof, will be explained in the following with the reference to the accompanying drawings, in which like reference characters designate the same or similar parts throughout the figure and wherein.

DETAILED DESCRIPTION OF PREFERRED EMBODIMENTS

A description will hereunder be given of a shoulder anchor mounting structure of a vehicle according to an embodiment of the present invention with reference to the accompanying drawings.

Figure 1:
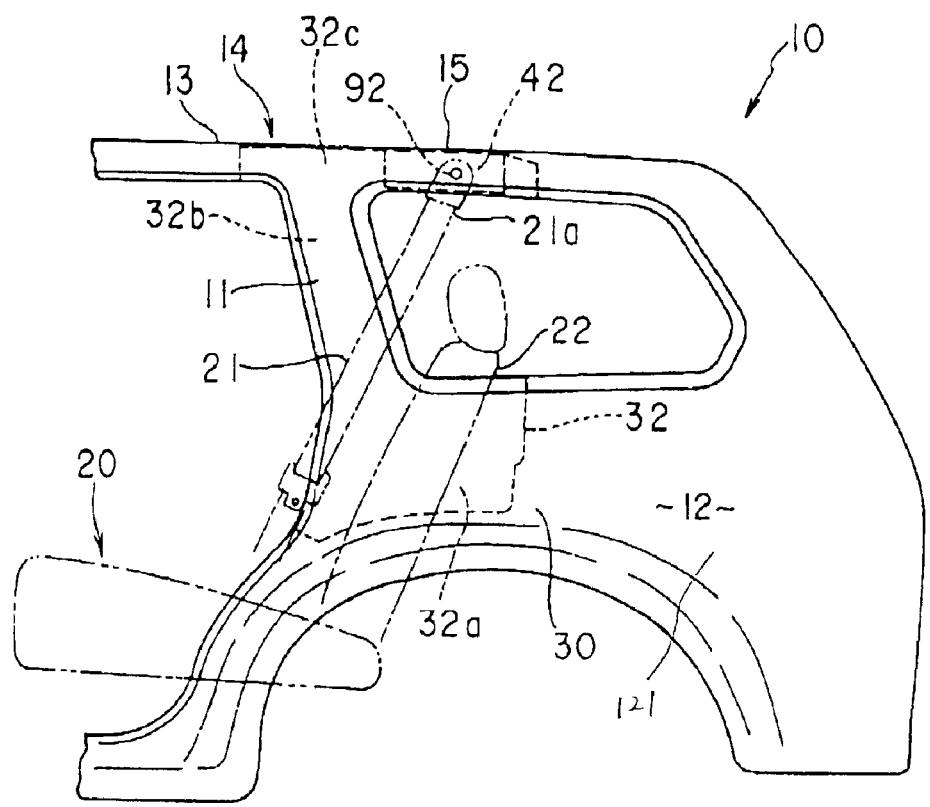
FIG. 1 is a side view showing a rear part of a vehicle provided with a shoulder anchor mounting part according to an embodiment of the present invention.

A vehicle 10, whose rear part is illustrated in FIG. 1, is comprised of a side wall 12 including a rear pillar 11 and a rear side panel 121, a roof 13, and a side roof 14 constituting the side of the roof 13. The side roof 14 is provided with a side roof rail 15 extending in the longitudinal direction of the vehicle 10.

The vehicle 10 has a seat belt 21 for a rear seat 20. An upper end 21a of the seat belt 21 is supported and fixed on the side roof rail 15 by a shoulder anchor member 92, which will be described later. A seat back 22 of the rear seat 20 is adapted to move to a position at the rear of the rear pillar 11.

Figure 2:
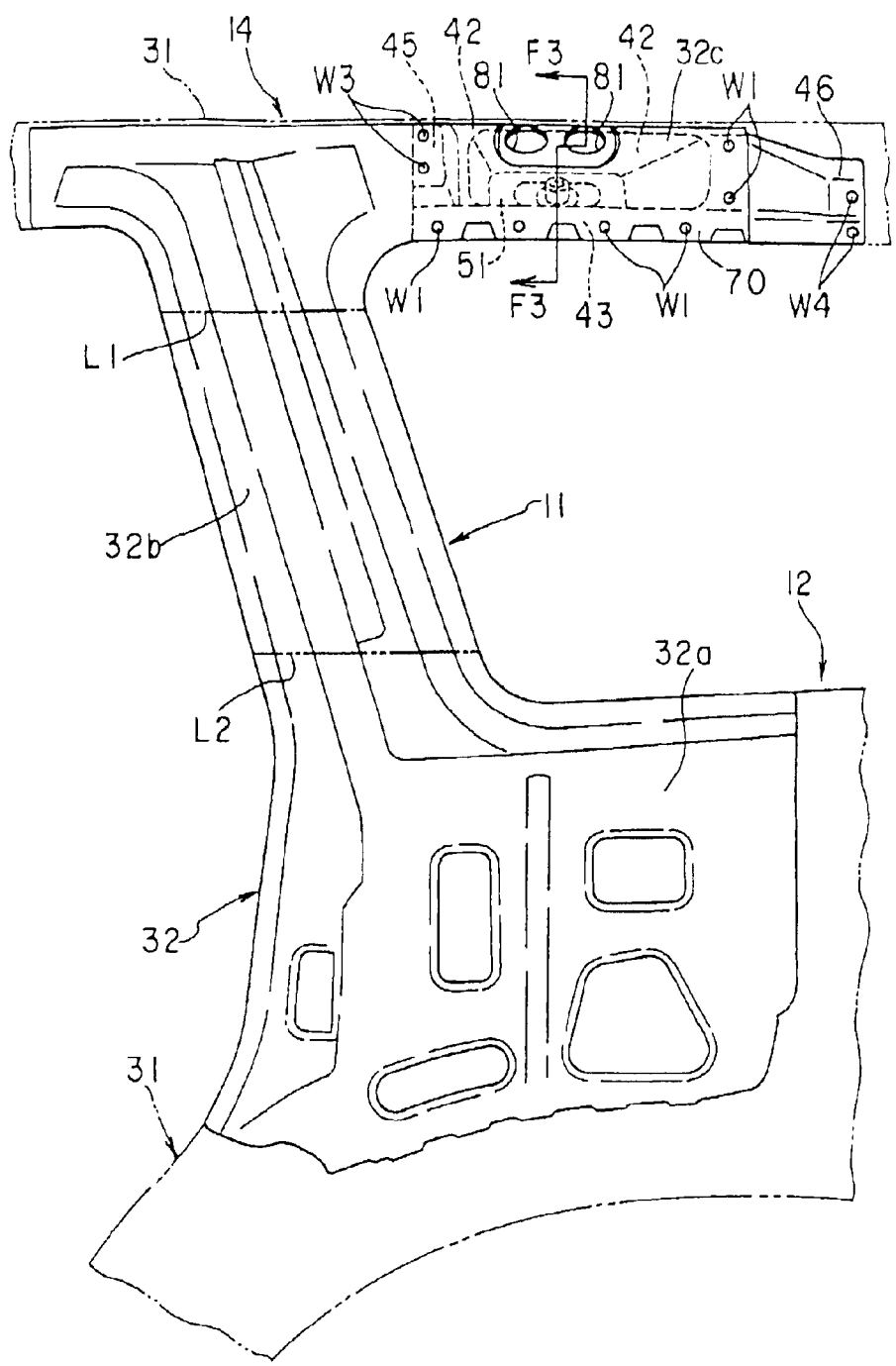
FIG. 2 is an enlarged side view showing a part of the vehicle provided with the shoulder anchor mounting part in FIG. 1.

The side wall 12 includes an outer panel 30 appearing in FIG. 1; an inner panel 31, a part of which is illustrated in FIG. 2; and a first reinforcement 32 as a rear pillar reinforce interposed between the outer panel 30 and the inner panel 31. Each of the outer panel 30, the inner panel 31, and the first reinforcement 32 is molded by pressing a sheet metal.

The first reinforcement 32 is constructed such that a side wall reinforcing section 32a that reinforces a wide range in the lower part of the rear pillar 11, a pillar reinforcing section 32b that reinforces the rear pillar 11, and a side rail reinforcing section 32c that reinforces the side roof 14 are formed as an integral unit. The side wall reinforcing section 32a and the pillar reinforcing section 32b are each formed of a steel plate with a thickness of about 0.8 mm, for example. On the other hand, the side rail reinforcing section 32c is formed of a steel plate with a thickness of about 1.3 mm, for example, and the plate thickness thereof varies at positions indicated by two-dot chain lines L1 and L2 of FIG. 2. Namely, the first reinforcement 32 is formed of a tailored blank material with the plate thickness varying according to the required stiffness.

Figure 3:
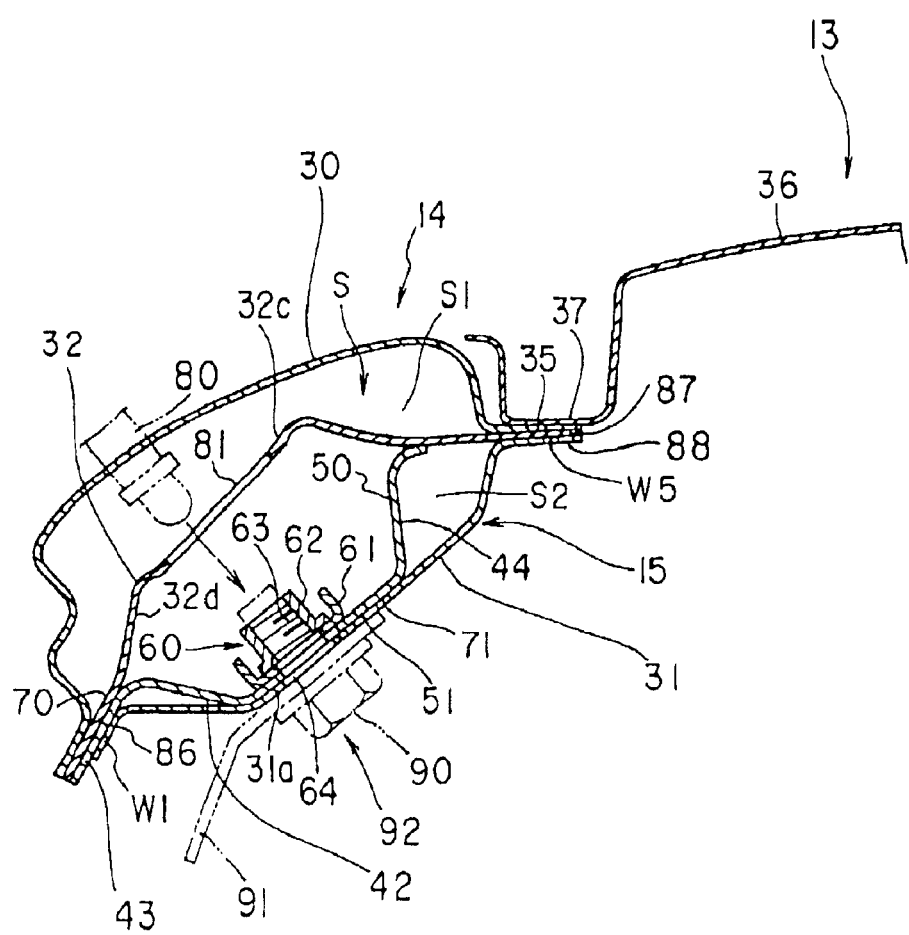
FIG. 3 is a sectional view showing the shoulder anchor mounting part taken along line F3—F3 of FIG. 2.

As shown in FIG. 3, the side roof rail 15 constituting the side roof 14 is comprised of the outer panel 30 as an outer member and the inner panel 31 as an inner member. The outer panel 30 and the inner panel 31 form a substantially hat-shaped section. The outer panel 30 and the inner panel 31 are joined by abutting on each other at the respective opening sides thereof, and this forms a closed section S between the outer panel 30 and the inner panel 31. The closed section S extends in the longitudinal direction of the vehicle 10. A side edge 37 of the roof panel 36 is joined to a flange 35 at the upper edge of the outer panel 30.

As shown in FIG. 3, the first reinforcement 32 is interposed between the outer panel 30 and the inner panel 31. The first reinforcement 32 partitions the closed section S into a first closed section S1 and a second closed section S2. The first closed section S1 is formed at the vehicle outer side of the first reinforce 32, and the second closed section S2 is formed at the vehicle inner side of the first reinforce 32.

Further, a second reinforcement member 42 as a rear seat belt reinforcement molded by pressing a metal plate is provided between the inner panel 31 and the first reinforcement 32.

The second reinforcement 42 is comprised of a peripheral edge 43 welded to the first reinforcement 32, a projecting portion 44 that has a substantially hat-shaped section and projects from the peripheral edge 43 to the vehicle inner side toward an inner wall 31a of the inner panel 31, a front end 45 that projects from the peripheral edge 43 to the vehicle outer side toward an inner wall surface 32d of the first reinforcement 32, and a rear end 46 that projects to rearward of the vehicle 10. The peripheral edge 43 is farmed at the periphery of the projection 44. The projecting portion 44 is long and narrow, and extends in the longitudinal direction of the second reinforcement 42 (i.e. the longitudinal direction of the vehicle 10).

Figure 4:
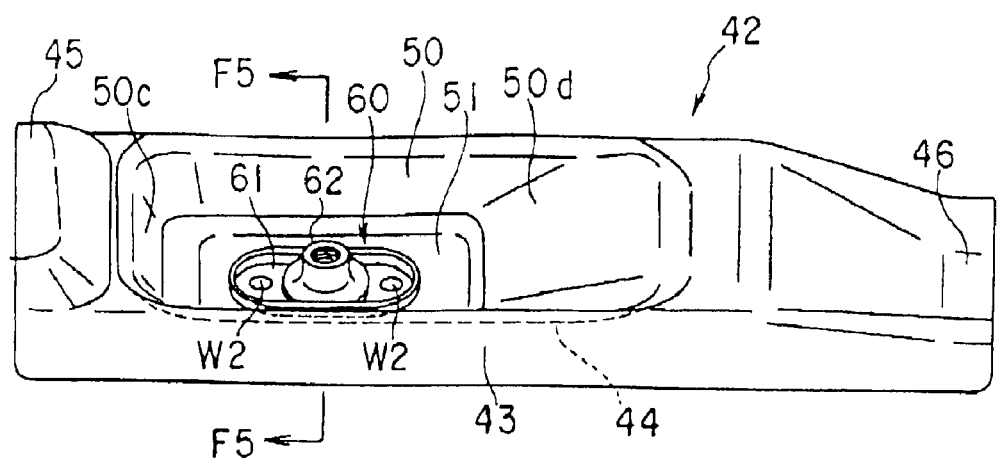
FIG. 4 is a perspective view showing a second reinforcement that is used for the shoulder anchor mounting part in FIG. 3.
Figure 5:
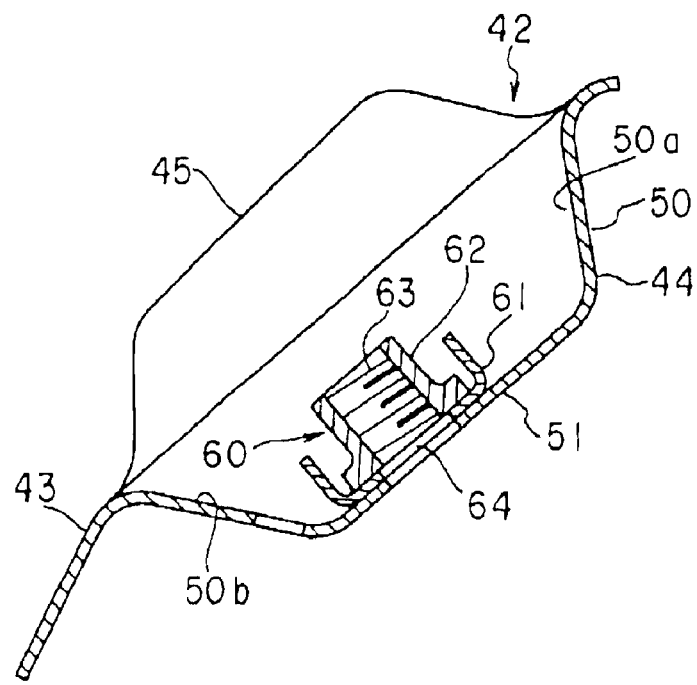
FIG. 5 is a sectional view showing a second reinforcement taken along line F5—F5 of FIG. 4.

As shown in FIG. 5, the projecting portion 44 includes a rising wall 50 that is integrated with the peripheral edge 43 by drawing and a bottom wall 51 that is formed at the top of the rising wall 50. The rising wall 50 is inclined such that the distance between inner surfaces 50a and 50b opposed to each other and the distance between inner surfaces 50c and 50d thereof shown in FIG. 4 gradually decrease away from the peripheral edge 43 toward the bottom wall 51. The rising wall 50 is integrated with the bottom wall 51 over the whole circumference thereof as well as the peripheral edge 43.

A nut assembly 60 is disposed on the bottom wall 51. The nut assembly 60 is comprised of a plate portion 61 that is welded to the bottom wall 51 and a nut member 62 that is fixed to the plate portion 61 by welding. In the bottom wall 51 and the plate portion 61, a through hole 64, into which an anchor bolt 90 is to be inserted, is formed at a position corresponding to a screw hole 63 of a nut member 62 as shown in FIG. 5.

As shown in FIGS. 2 and 3, the peripheral edge 43 of the second reinforcement 42 is joined to a flange 70 of the first reinforcement 32 by spot welding at a plurality of welding positions W1.

In an abutment part 71 where the bottom wail 51 and the inner wall surface 31a abut on each other, the bottom wall 51 is joined to the inner panel 31 by spot welding at positions indicated by W2 in FIG. 4. As shown in FIG. 3, in the first reinforcement 32, a through hole 81 serving as a work hole, into which a welding gun 80 is to be inserted, is formed at a position opposed to the welding positions W2.

The bottom wall 51 is joined to the inner panel 31 at the welding positions W2 by spot welding using the welding gun 80 before the outer panel 30 is joined to the inner panel 31. Specifically, by inserting the welding gun 80 into the first reinforcement 32 from the through hole 81, an abutment part where the inner wall 31a of the inner panel 31, the bottom wall 51, and the plate portion 61 abut on each other is spot-welded at the welding positions W2. The plate portion 61 is held at a predetermined position of the bottom wall 51 by provisional welding in advance.

In this way, the through hole 81, into which the welding gun 80 can be inserted, is formed in the first reinforcement 32, and thus, the bottom wall 51 and the inner wall 31a of the inner panel 31 can be welded using the welding gun 80, which is the existing welding equipment.

The front end 45 of the second reinforcement 42 is spot-welded to the inner wall surface 32d of the second reinforcement 32 at welding positions W3. The rear end 46 of the second reinforcement 42 is spot-welded to the inner panel 31 at welding positions W4.

As shown in FIG. 3, the flange 70 formed at the lower edge of the first reinforcement 32, the peripheral edge 43 of the second reinforcement 42, and a flange 86 of the inner panel 31 are joined to each other at a welding position W1. Further, a flange 87 formed at the upper edge of the first reinforcement 32 and an upper edge 88 of the inner panel 31 are joined to each other at a welding position W5.

The anchor bolt 90 is engaged with the nut member 62, and an anchor plate 91 is fastened on the side roof rail member 15 by the anchor bolt 90. The upper end 21a of the seat belt 21 is supported by the anchor plate 91. The nut member 62, the anchor bolt 90, and the anchor plate 91 constitute an example of the shoulder anchor member 92.

As described above, according to the present embodiment, the peripheral edge 43 of the second reinforcement 42 having the projecting portion 44 with the substantially hat-shaped section formed by drawing is joined to the first reinforcement 32, and the bottom wall 51 of the second reinforcement 42 is joined to the inner panel 31. The shoulder anchor member 92 is mounted on an abutment part 71 where the bottom wall 51 and the inner panel 31 abut on each other. Further, the second reinforcement 42 is provided in the closed section S2 with a high stiffness, which is formed by the inner panel 31 and the first reinforcement 32.

With this arrangement, a mounting part of the shoulder anchor member 92 provided on the side roof rail 15 is effectively reinforced by the second reinforcement 42, so that the mounting part of the shoulder anchor member 92 exhibits a high stiffness against a load inputted from the seat belt 21 to the shoulder anchor member 92.

It is preferred that the peripheral edge 43 of the second reinforcement 42 is joined to the first reinforcement 32 or the like over the whole circumference thereof. However, a part of the peripheral edge 42 (e.g. one side of the reinforcement 42) may be opened, it is also preferred that the rising wall 50 of the projecting portion 44 is integrated with the peripheral edge 42 over the whole circumference of the bottom wall 51, but depending on the circumstances, a part of the rising wall 50 in the circumferential direction may be opened.

Further, the first reinforcement 32 is constructed such that the side wall reinforcing section 32a that reinforces the lower part of the rear pillar 11, the pillar reinforcing section 32b that reinforces the rear pillar 11, and the side rail reinforcing section 32c that reinforces the side roof 14 are formed as the integral unit. With this arrangement, a load inputted to the shoulder anchor member 92 is transmitted to the side rail reinforcing section 32c, the pillar reinforcing section 32b, and the side wall reinforcing section 32a in this order so that the load can be efficiently diffused toward a vehicle body.

It is to be understood that the present invention is not limited to the embodiment disclosed, but various variations of the above described embodiment may be possible without departing from the spirits of the present invention.

What is claimed is:

1. A shoulder belt anchor mounting structure of a vehicle comprising:

a side roof rail having an inner member and an outer member joined together to form a closed section, said side roof rail extending substantially along a longitudinal direction of the vehicle at a roof side of the vehicle;

a first reinforcement positioned between said inner and outer members and partitioning the closed section into a first closed section and a second closed section;

a second reinforcement positioned between said first reinforcement and said inner member and having a peripheral edge thereof joined to said first reinforcement and a bottom wall thereof joined by weld to an inner surface wall of said inner member; and a shoulder anchor member for supporting a seat belt mounted on a portion where the bottom wall of said second reinforcement and the inner member are joined.

2. A shoulder belt anchor mounting structure of a vehicle according to claim 1, further comprising a rear pillar, wherein said shoulder belt anchor member is fixed to said side roof rail rear of said rear pillar.

3. A shoulder belt anchor mounting structure of a vehicle according to claim 1, wherein a vehicle rear side panel is arranged in a lower part of said rear pillar and said reinforcement extends to said rear side panel.

4. A shoulder belt anchor mounting structure of a vehicle according to claim 1, wherein said first reinforcement has a through hole for passage of a welding gun formed at a position corresponding to the bottom wall of said second reinforcement where the bottom wall and the inner member are joined to each other and for allowing the welding gun to weld said bottom wall to said inner member.

5. A shoulder belt anchor mounting structure of a vehicle according to claim 4, wherein said second reinforcement has a hat-shaped projecting portion that projects from said peripheral edge to the bottom wall.

6. A shoulder belt anchor mounting structure of a vehicle according to claim 5, wherein said projecting portion includes a rising wall integrated with the bottom wall over the entire circumference thereof and the peripheral edge.

7. A shoulder belt anchor mounting structure of a vehicle according to claim 6, wherein said rising wall is inclined so that a distance between opposing wall portions thereof decreases away from said peripheral edge toward said bottom wall.

8. A vehicle comprising:
a side roof rail having an inner member and an outer member joined together to form a closed section, the side roof rail extending substantially along a longitudinal direction of the vehicle;
a first reinforcement positioned between the inner and outer members and partitioning the closed section into a first closed section and a second closed section;
a second reinforcement positioned between the first reinforcement and the inner member and having a peripheral edge thereof joined to the first reinforcement and a bottom wall thereof joined by a weld to an inner surface wall of the inner member; and
a shoulder anchor member for supporting a seat belt mounted on a portion where the bottom wall of the second reinforcement and the inner member are joined.

9. A vehicle according to claim 8, further including a rear pillar and a rear side panel extending below the rear pillar, wherein the first reinforcement extends to the rear side panel.

10. A vehicle according to claim 8, wherein said first reinforcement has a through hole for passage of a welding gun formed at a position corresponding to the bottom wall of the second reinforcement where the bottom wall and the inner member are joined to each other and for allowing the welding gun to weld the bottom wall to the inner member.

11. A vehicle according to claim 8, wherein the second reinforcement has a hat-shaped projecting portion that projects from the peripheral edge to the bottom wall.

* * * * *